United States Patent [19]

Takeuchi et al.

[11] Patent Number: 5,248,712

[45] Date of Patent: Sep. 28, 1993

[54] BINDERS FOR FORMING A CERAMICS SHEET AND APPLICATIONS THEREOF

[75] Inventors: Tatsuro Takeuchi, Tsukuba; Motoya Mouri, Tsuchiura; Tetsuya Sahara, Tsukuba, all of Japan

[73] Assignee: Takeda Chemical Industries, Ltd., Osaka, Japan

[21] Appl. No.: 809,329

[22] Filed: Dec. 18, 1991

[30] Foreign Application Priority Data

Dec. 21, 1990 [JP] Japan ................................. 2-413544
Aug. 8, 1991 [JP] Japan ................................. 3-199042

[51] Int. Cl.$^5$ ........................... C08K 5/15; C08L 5/00
[52] U.S. Cl. .................................. 524/56; 524/54; 524/55; 524/57; 524/517; 526/238.23
[58] Field of Search ......................... 524/54–57, 524/517; 526/238.23

[56] References Cited

U.S. PATENT DOCUMENTS 4,093,576 6/1978 deWijn ........................ 524/56
4,374,216 2/1983 Dammann ................... 524/55
4,963,629 10/1990 Driemel et al. .......... 526/238.23

FOREIGN PATENT DOCUMENTS 0325425 7/1989 European Pat. Off. .
0346097 12/1989 European Pat. Off. ............. 524/55
1-286955 1/1989 Japan .
2-267157 10/1990 Japan .
3-97649 4/1991 Japan .

*Primary Examiner*—Paul R. Michl
*Assistant Examiner*—LaVonda DeWitt
*Attorney, Agent, or Firm*—Wegner, Cantor, Mueller & Player

[57] ABSTRACT

A binder for preparing an aqueous ceramics slurry, which contains a hydrophilic polymer such as a water-soluble (meth)acrylic polymer, a polysaccharide of natural origin such as pectin, pectinic acid, glucan, etc., and a polyvinyl compound such as poly(vinyl butyral). The aqueous ceramics slurry contains less than 25 parts by weight of the binder to 100 parts by weight of ceramics powder. The slurry is applied on a carrier film by a doctor blade method and dried to give a ceramics green sheet. A ceramics sheet can be produced by sintering the green sheet.

15 Claims, No Drawings

BINDERS FOR FORMING A CERAMICS SHEET AND APPLICATIONS THEREOF

FIELD OF THE INVENTION

The present invention relates to a binder for forming a ceramics sheet in an aqueous system, more particularly, to a binder for forming a ceramics sheet in an aqueous system by doctor blade methods.

Further, the invention relates to an aqueous slurry for forming a ceramics green sheet; a ceramics green sheet and a method of forming the same; and a ceramics sheet and a method of producing the same.

BACKGROUND OF THE INVENTION

The ceramics sheet is widely utilized, for example, in a circuit substrate of electric parts, or separating plates for thin layer chromatography.

Alumina sheets used as ceramics circuit substrate have been prepared by the following steps of:

preparing a slurry by mixing powdery alumina with binders (e.g. organic binders, plasticizers, anticoagulants) and organic solvent;

applying the ceramics slurry on a carrier film in a specific thickness with a doctor blade;

drying the ceramics slurry developed on the carrier film by evaporating the organic solvent to give an alumina green sheet;

cutting the green sheet in a predetermined size and printing a circuit thereon;

laminating and pressing a plurarity of the processed sheets; and drying and sintering the laminate to give a calcined alumina sheet (ceramics sheet) [Katsuyoshi Saito, "Moldings and Organic Materials of Fine Ceramics", pp 219-232, Published Aug. 26, 1985, C.M.C. Co., Japan].

The ceramics sheets obtained by the above procedures are used as a ceramics circuit substrate, and the above method is nowadays utilized for mass production.

Japanese Patent laid open No. 267157/1990 discloses a binder in an organic solvent, which comprises acrylic resin containing n-butyl methacrylate as a main component.

However, the above method and the binder encounter firstly with problems due to the organic solvent which needs the disaster prevention assessment and health control of operators, because the working circumstances become worse. Further, there is needed any assessment of pollution coming from outflow of the organic solvents (e.g. trichloroethylene, etc.) which would raise the cost of production. Accordingly, the above-mentioned method and the binder have defects such as complicated installations and troublesome operations.

Recently, a method of using water as a solvent (aqueous doctor blade method) has been investigated. In the aqueous doctor blade method is proposed a water-soluble binder. Japanese Patent laid open No. 226762/1989 discloses a binder for forming a ceramics sheet, which comprises a polymer obtained by neutralization of a polymer, which is produced by the reaction of an alkyleneimine with a copolymer having a carboxyl group, with acidic reagents. Japanese Patent laid open No. 236931/1989 teaches a dispersing agent containing a copolymer having a sulfonic acid group or its water-soluble salt, and Japanese Patent laid open No. 274831/1989 discloses a deflocculant containing a polyglycerol fatty acid ester as a main ingredient. In Japanese Patent laid open No. 286955/1989 is disclosed a latex obtained by emulsion or suspension polymerization of an oil-soluble monomer in the presence of a water-soluble (meth)acrylic resin. Furthermore, Japanese Patent laid open No. 290548/1989 discloses a ceramics slurry containing 500 to 800 parts by weight of water and 1 to 2 parts by weight of an organic solvent.

However, in the aqueous ceramics slurry containing these binders, powdery ceramics are apt to coagulate in the aqueous solvent, and the fluidity of ceramics slurry is lowered because of elevation of the viscosity, whereby powdery ceramics are insufficiently dispersed in the slurry. Therefore, the ceramics slurry causes a problem that a high density of a ceramics sheet having even surfaces is not obtained.

Since the surface tension of water is higher than that of organic solvents, an aqueous slurry also shows high surface tension. Therefore, when the ceramics slurry is applied on a carrier film by an aqueous doctor blade method, there still remains a problem that a ceramics green sheet cannot be formed in uniform thickness because the film repels the slurry.

Furthermore, when the ceramics green sheet thus obtained is dried, the problem of high shrinkage ratio of the sheet also remains unsolved.

SUMMARY OF THE INVENTION

Accordingly, it is an object of the present invention to provide a novel binder for preparing a ceramics slurry, and forming a ceramics green sheet and a ceramics sheet in an aqueous system.

It is another object of the present invention to provide a binder for economically and efficiently preparing a ceramics slurry and forming a ceramics green sheet in an aqueous system without pollution by doctor blade methods.

It is a further object of the present invention to provide a binder which gives, even when used in small amount, a favorable ceramics slurry.

It is still another object of the present invention to provide an aqueous ceramics slurry being excellent in mouldability, anticoagulation and dispersing stability, and suitable for forming a ceramics green sheet by doctor blade methods.

It is a still further object of the present invention to provide a ceramics green sheet having even surfaces, uniform thickness, flexibility, excellent workability, free of cracks and of low shrinkage ratio by drying and sintering, and can being recycled.

It is yet another object of the present invention to provide a ceramics green sheet having improved laminating adhesive properties and being useful as a substrate of a multilayered integrated circuit.

It is yet a further object of the present invention to provide a ceramics sheet having even surfaces and free of cracks, and being useful as a circuit substrate.

A further object of the present invention is to provide a method of forming a ceramis green sheet by use of an aqueous ceramics slurry.

A still further object of the present invention is to provide a method of producing a ceramics sheet.

As a result of intensive investigations on a method of dispersing powdery ceramics in water to prepare a slurry and of producing a ceramics green sheet by a doctor blade method, the present inventors found that the use of a binder comprising a hydrophilic polymer having an acrylic monomer and/or a methacrylic monomer as a monomer component and a polysaccharide of natural origin gives excellent properties to a ceramics slurry and a ceramics green sheet. The present invention has been completed based on these findings.

Accordingly, the present invention provides a binder for forming a ceramics sheet, which comprises at least one hydrophilic polymer having an acrylic monomer and/or a methacrylic monomer as a monomer component and a polysaccharide of natural origin. The acrylic monomer and the methacrylic monomer may have an alkyl group, a carboxyl group, a hydroxyl group, an ether linkage, a glycidyl group, or the like. The hydrophilic polymer may be a homopolymer or a copolymer. The copolymer may be constituted of the acrylic monomer and/or the methacrylic monomer. The copolymer may further contain a copolymerizable monomer to the acrylic monomer and/or the methacrylic monomer as a monomer component. The copolymerizable monomer has a copolymerizable double bond. Typical examples of the copolymerizable monomer include styrene-type monomers, maleic acid, vinyl acetate, or the like. The hydrophilic polymer may have carboxyl groups and its salt, and which may be in the form of a dispersion or a solution in aqueous media. The hydrophilic polymer includes, for example, a water-soluble polymer having an acid value of 30 to 500, and a glass transition temperature of $-30°$ C. to $50°$ C.

The polysaccharide may originate from plant, animal and microorganism. The examples of polysaccharide are extractive polysaccharides, seed polysaccharides, exudate polysaccharides, red seaweed polysaccharides, brown seaweed polysaccharides, structural polysaccharides, food-reserve polysaccharides, mucopolysaccharides, 1,3-glucans, 1,4-glucans, dextran, gellan gum, xanthane gum and the like. The polysaccharide includes pectin, pectinic acid or glucans such as $\beta$-1,3-glucans (e.g. curdlan, paramylon, pachyman, scleroglucan, etc.). The polysaccharide may be treated with a base, an enzyme or an acid.

The ratio of the polysaccharide to the hydrophilic polymer is, for example, 0.5 to 10,000 parts by weight of polysaccharide to 100 parts by weight of the hydrophilic polymer.

In order to enhance the laminating adhesive property, the binder may further comprises a hydrophilic polyvinyl compound such as poly(vinyl esters), saponified poly(vinyl esters), ethylene-(vinyl ester) copolymers, saponified ethylene-(vinyl ester) copolymers, polyvinyl acetals, (vinyl acetal)-(meth)acrylate copolymers, poly(vinyl ethers), graft copolymers of unsaturated carboxylic acid and saponified ethylene(vinyl ester) copolymer, etc.

Further, the present invention also provides an aqueous ceramics slurry containing the binder, a ceramics powder and an aqueous medium. The ceramics powder includes, for example, powdery inorganic oxides, powdery inorganic carbides, powdery inorganic nitrides, powdery inorganic borides, powdery natural or synthetic minerals, and the like. The amount of the binder is, for instance, in the range of 0.5 to 25 parts by weight to 100 parts by weight of the ceramics powder.

The slurry is useful for preparing a ceramics green sheet by applying the slurry on a carrier substrate by a doctor blade method. The ceramics sheet may be produced by sintering the ceramics green sheet.

The term "hydrophilic" as used herein includes "water-soluble" or "water-dispersible". The term "acrylic monomer" or "methacrylic monomer" (abbreviated as "(meth)acrylic monomer" hereinafter) means a monomer having an acryloyl group or a methacryloyl group. The term "polyvinyl compound" means a homopolymer or a copolymer of a vinyl compound in which the vinyl group is directly bound to an oxygen atom.

DETAILED DESCRIPTION OF THE INVENTION

The hydrophilic polymer may be a homopolymer or a copolymer having a (meth)acrylic monomer as a monomer component. As typical examples of the (meth)acrylic monomer, there may be mentioned an alkyl (meth)acrylate having an alkyl group of 1 to 20 carbon atoms such as methyl (meth)acrylate, ethyl (meth)acrylate, propyl (meth)acrylate, isopropyl (meth)acrylate, butyl (meth)acrylate, isobutyl (meth)acrylate, hexyl (meth)acrylate, octyl (meth)acrylate, 2-ethylhexyl (meth)acrylate, lauryl (meth)acrylate, stearyl (meth)acrylate, and the like; (meth)acrylic acid; a (meth)acrylate having hydroxyl group such as 2-hydroxyethyl (meth)acrylate, 2-hydroxypropyl (meth)acrylate, 3-hydroxypropyl (meth)acrylate, diethyleneglycol mono(meth)acrylate, dipropyleneglycol mono(meth)acrylate, and the like; a (meth)acrylate having an ether linkage such as methoxymethyl (meth)acrylate, ethoxymethyl (meth)acrylate, butoxymethyl (meth)acrylate, methoxyethyl (meth)acrylate, ethoxyethyl (meth)acrylate, butoxyethyl (meth)acrylate, methylcellosolve (meth)acrylate, ethylcellosolve (meth)acrylate, butylcellosolve (meth)acrylate, and the like; a (meth)acrylate having a glycidyl group such as glycidyl (meth)acrylate, and the like. These (meth)acrylic momoners may be used singly or in combinaion.

Among these monomers, alkyl (meth)acrylates having an alkyl group of 1 to 10 carbon atoms, (meth)acrylic acid, (meth)acrylates having a hydroxyl group, and (meth)acrylates having an ether linkage are preferably used. Preferred (meth)acrylates include, for example, alkyl (meth)acrylate having an alkyl group of 1 to 8 carbon atoms. The hydropholic polymer comprises preferably (meth)acrylic acid as its monomer ingredient.

The hydrophilic polymer can further comprise a copolymerizable monomer to the (meth)acrylic monomer as a momoner component. Typical examples of the copolymerizable monomer are a styrene type monomer such as styrene, $\alpha$-methylstyrene, vinyltoluene, etc.; an unsaturated monocarboxylic acid such as crotonic acid, etc; an unsaturated dicarboxylic acid and anhydride thereof such as maleic acid, maleic anhydride, fumaric acid, itaconic acid, etc.; vinyl acetate, acrylonitrile, N-methylolacrylamide, acrylamide, and the like. The dicarboxylic acid may be used as a dicarboxylic acid monoalkyl ester (e.g. maleic acid monomethyl ester, maleic acid monoethyl ester, maleic acid monobutyl ester, fumaric acid monoethyl ester, fumaric acid monobutyl ester, itaconic acid monoethyl ester, itaconic acid monobutyl ester, etc.), or a dicarboxyic acid dialkyl ester (e.g. maleic acid dimethyl ester, maleic acid diethyl ester, maleic acid dibutyl ester, maleic acid dihexyl ester, maleic acid dioctyl ester, itaconic acid diethyl ester, etc.). These copolymerizable monomers may also be used singly or in combination.

The proportion of the (meth)acrylic monomer to the total amount of monomers is, for example, 10 to 100% by weight, preferably 25 to 100% by weight, more preferably 50 to 100% by weight.

As a hydrophilic polymer, a film-forming polymer when mixed with a ceramics powder is preferably used. The film-forming polymer has a glass transition temperature of −30° C. to 50° C., preferably −20° C. to 30° C. The hydrophilic polymer has generally a molecular weight of 5,000 to 1,000,000, preferably 10,000 to 200,000.

The hydrophilic polymer may be an cationic polymer having basic nitrogen atoms, but preferably an anionic polymer having a carboxyl group and its salt. When the hydrophilic polymer is in the form of a dispersion such as an emulsion in aqueous media, an anionic and/or a nonionic polymer may be used. The anionic hydrophilic polymers are usually used.

Preferred hydrophilic polymer includes a polymer emulsion and a water-soluble polymer. The water-soluble polymers are more preferable. The acid value of the water-soluble polymer is, for instance, in the range of 30 to 500, preferably 50 to 450, more preferably 75 to 400.

In the water-soluble polymer, the content of the monomer unit having carboxyl group(s) or its salt is usually in the range of 5 to 70 mol %, preferably 10 to 60 mol %, more preferably 15 to 50 mol %.

Viscosity of 40 weight % of aqueous solution of the water-soluble hydrophilic polymer, measured by a B-type viscosimeter, is, for example, in the range of 100 to 20,000 cps at 25° C.

As a base used for neutralization of carboxyl groups of the hydrophilic polymer to form the salt, a water-soluble inorganic base (e.g. ammonia, NaOH, KOH, etc.) or a water-soluble organic base can be used. Ammonia and/or the water-soluble organic base which does not remain in the ceramics sheet obtained by sintering is preferably used. As typical examples of the water-soluble organic base, there may be mentioned, an alkylamine such as dimethylamine, diethylamine, trimethylamine, triethylamine, and the like; an alkanolamine such as ethanolamine, diethanolamine, triethanolamine, dimethylaminoethanol, and the like; morpholine, and so on. Preferred bases include, for example, ammonia and an alkanolamine.

The bases are used usually in the range of 50 to 120 mol %, preferably 75 to 100 mol % to carboxyl groups of the polymer.

In the present invention, commercially available hydrophilic polymers can be used. For example, commercially available (meth)acrylic resin in aqueous solution includes a water soluble binder such as HD125, HD126, HD127 and HD132 (each Trade name and Number of Toa Gosei Chemical Industries, Co., Japan), ARON AS series (AS-1500, AS-1600, AS-1700; each Trade name and Number of Toa Gosei Chemical Industries, Co.), SERAMO-TB01 (Trade name of Dai-ichi Kogyo Seiyaku, Co., Japan) and the like. The hydrophilic polymers may be generally available as an aqueous solution containing 30 to 50% by weight of the polymer.

Polysaccharides of natural origin include those polysaccharides originated from plant, animal, microorganism and the like.

Typical examples of the polysaccharides originated from plant include extractive polysaccharides such as pectin, pectinic acid, arabinogalactane or the like; seed polysaccharides such as guar gum, locust bean gum, tara gum, tamarind seed gum; exudate polysaccharide such as tragacanth gum, karaya gum, arabic gum, ghatti gum, or the like; red seaweed polysaccharides such as carrageenan or the like; brown seaweed polysaccharides such as alginic acid or the like; structural polysaccharides such as xylan or the like; and food-reserve polysaccharidas such as konjak mannan or the like. Among these polysaccharides, plant extractive polysaccharides, particularly, pectin and pectinic acid are preferred.

Polysaccharides originated from animal include, for example, structural polysaccharides such as chitosan or the like; and mucopolysaccharides such as hyaluronic acid, chondroitin sulphate or the like.

As typical examples of the polysaccharides originated from microorganism, there may be mentioned 1,3-glucans such as curdlan, paramylon, pachyman, scleroglucan or the like; 1,4-glucans such as pullulan or the like; dextran, gellan gum, xanthan gum or the like. The 1,3-glucan includes $\beta$-1,3-glucan such as curdlan, paramylon, pachyman, scleroglucan and the like. Among these polysaccharides, the $\beta$-1,3-glucans are preferable, and curdlan and paramylon are more preferable.

Among these polysaccharides, pectin, pectinic acid and glucans including 1,3-glucans such as $\beta$-1,3-glucans and 1,4-glucans are more preferred without depending upon their sources. Furthermore, among the glucans, $\beta$-1,3-glucans are particularly preferred. The term "1,3glucan" as used herein inclues a polysaccharide containing D-glucose as a monosaccharide unit and polymers having 1,3-glycosidic linkages as a main ingredient, for example, $\beta$-1,3-glucans as shown below as (a)–(c).

(a) Curdlan produced by *Alcaligenes faecalis* var. *myoxgenes* 10C3K, a kind of soil bacteria, or the like [see Agricultural Biological Chemistry, Vol. 30, 196(1966)].

(b) Paramylon produced by *Euglena gracilis*, unicellular algae [see Japanese Patent laid open No. 37297/1989].

(c) Pachyman produced by *Poria cocas*, Scleroglucan produced by *Sclerocium glucanicum*, or the like.

$\beta$-1,3-glucans such as curdlan, paramylon, pachyman, scleroglucan or the like, particularly curdlan is preferablly used.

Further, the polysaccharides of the present invention include not only those naturally occurring polysaccharides obtained by collecting them as they are or by extracting procedure, but also the products obtained by the following treatment of the naturally occurring polysaccharides with a base, an enzyme and an acid.

1) Aging process by treating with a non-metallic basic compound such as ammonia or triethanolamine or a basic compound such as sodium hydroxide, potassium hydroxide, sodium bicarbonate or calcium carbonate in aqueous solution or aqueous mixed solution of water and aqueous solvent such as acetone, ethanol or methanol.

2) Conversion to lower molecular compounds by enzymatic hydrolysis.

3) Conversion to lower molecular compounds by acid decomposition.

For example, curdlan having the degree of polymerization of about 400 to 500 is allowed to react with 90% formic acid at 100° C. for 10 to 20 minutes to give curdlan having the degree of polymerization of about 70 to 100.

When pectin or pctinic acid is treated according to the treatment 1) to neutralize the free carboxyl groups of the polysaccharides to a basic salt moiety together with advanced dissociation to a carboxyl anion, whereby the conversion to a lower molecular compounds by hydrolysis occurs in some degree. Typical reaction conditions for aging the pectin or pectinic acid are shown as follows:

(1) More than 1 equivalent amount of the basic compound is added to that of free carboxyl group of pectin or pectinic acid, (2) aqueous solution or aqueous mixed solution is adjusted to pH 7.0 to 12.0, preferably 8.0 to 10.5, (3) the reaction temperature is usually kept at 10° to 80° C., and (4) the reaction time is generally about 1 day and night.

Concerning the enzymatic hydrolysis in treatment 2), pectin or pectinic acid is hydrolyzed by pectin main chain hydrolyzing enzymes such as pectinase (EC 3.2.1.15), pectin transeliminase, and other polysaccharides are hydrolyzed by glucanase type enzymes. The enzymatic reactions may be conducted according to the optimal conditions of the enzyme used.

Such treated pectin or pectinic acid may be appropriately used in the present invention similarly to $\beta$-1,3-glucans such as curdlan or the like. The above-mentioned lower molecular weight polysaccharides of natural origin, particuraly curdlan, pectin and pectinic acid, are also used in the present invention.

The degree of polymerization of the polysacchride is generally within about 20 to 500.

The polysaccharides may be used singly or in combination. Preferred polysaccharides comprise pectin and $\beta$-1,3-glucans in combination.

The binders of the present invention can be prepared by mixing the hydrophilic polymer with the polysaccharide of natural origin. By using the binder, a ceramics composition for preparing a ceramics slurry is obtained. The composition comprising a ceramics powder and the binder is prepared by admixing the ceramics powder and the binder at an amount mentioned below. To prepare the ceramics slurry mentioned below, the binder may be added, or the respective ingredients of the binder may be added independently into the slurry.

Of the ingredients of the binder above, insoluble polysaccharides such as curdlan are preferably used in the form of a dispersion. The dispersion may be prepared by mixing with water while keeping the concentration of the polysaccharide about 5% by weight or less, sufficiently stirring with a cutter mixer or the like.

Generally, the polysaccharide is used in an amount of 0.5 to 10,000 parts by weight, preferably 1 to 200 parts by weight, per 100 parts by weight of the hydrophilic polymer. When the hydrophilic polymer is used in aqueous solution, the amount is changed into that of the solid ingredient.

The binder of the present invention may contain a hydrophilic polyvinyl compounds. The binder of the invention containing the polyvinyl compound can still improve laminating adhesive property of the ceramics sheet. The laminating adhesive property is useful in preparing laminated substrates of a ceramics circuit.

The polyvinyl compounds have the following structural units (I) and/or (II);

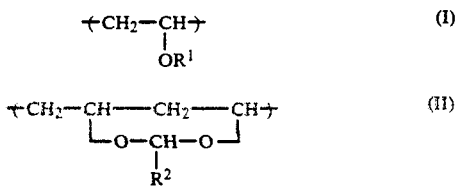

wherein $R^1$ is hydrogen, $C_{1-6}$ alkyl or $C_{1-10}$ alkanoyl, and $R^2$ is hydrogen or $C_{1-5}$ alkyl.

Preferred $R^1$ in the structural unit (I) is hydrogen, methyl, ethyl, propyl, butyl, isobutyl, acetyl, propionyl, butyryl, isobutyryl, valeryl, hexanoyl or octanoyl group. Among these substituents, hydrogen and acetyl group are more preferable. Preferred $R^2$ in the structural unit (II) is hydrogen or propyl group, particularly propyl group.

As typical examples of the hydrophilic polyvinyl compound represented by the structural units (I) and/or (II), there may be mentioned poly(vinyl esters) such as poly(vinyl acetates), poly(vinyl butyrates), poly(vinyl caprylate) and the like; (partial-)saponified poly(vinyl esters) such as poly(vinyl alcohol); ethylene-(vinyl ester) copolymers such as ethylene-(vinyl acetate) copolymer; (partial-)saponified ethylene(vinyl ester) copolymers such as ethylene-(vinyl alcohol) copolymer; (meth)acrylate-(vinyl ester) copolymers; (partial-)saponified (meth)acrylate-(vinyl ester) copolymers; acetalified derivatives of (partial-)saponified (meth)acrylate-(vinyl ester) copolymers such as methacrylate-(vinyl butyral) copolymer; poly(vinyl ethers) such as poly(methyl vinyl ether), poly(ethyl vinyl ether), poly(propyl vinyl ether), poly(butyl vinyl ether), poly(isobutyl vinyl ether) and the like; poly(vinyl acetals) such as poly(vinyl formal), poly(vinyl butyral) and the like.

The polyvinyl compound also includes graft copolymers of unsaturated carboxylic acids and (partial-)saponified ethylene-(vinyl ester) copolymers such as graft copolymers of acrylic acid and/or methacrylic acid and ethylene-(vinyl alcohol) copolymer.

Poly(vinyl esters), ethylene-(vinyl ester) copolymers and meth(acrylate)-(vinyl esters) copolymers are generally used as (partial-)saponified derivatives, which may be further acetalified.

The degrees of saponification of the poly(vinyl esters) and ethylene-(vinyl ester) copolymer are generally more than 80%, preferably more than 90%. The degree of acetalification of the poly(vinyl esters) is generally less than 40%, preferably less than 20%.

The hydrophilic polyvinyl compound generally has a degree of polymerization of about 100 to 3,000.

Viscosity of 25% by weight of aqueous solution of the hydrophilic polyvinyl compound, measured by a B-type rotary viscosimeter, may be in the range of 100 to 30,000 at 25° C.

Preferred hydrophilic polyvinyl compounds are poly(vinyl acetals), especially poly(vinyl butyral), such as CERAMO TB-13 (Trade name of Dai-ichi Kogyo Seiyaku Co., Ltd., Japan); poly(vinyl alcohol) such as PVA-110, PVA-210, PVA-205C (each Trade name of KURARAY CO., LTD., Japan); partial-saponified ethylene-(vinyl acetate) copolymer such as HEVA (DUMILAN ™, Trade name of Takeda Chemical Industries, LTD., Japan); and graft copolymers of unsaturated carboxylic acids and partial-saponified ethylene-(vinyl acetate) copolymer such as C-HEVA (DUMILAN ™ C-1550, Trade name of Takeda Chemical Industries, LTD.).

Of said polyvinyl compounds, water-soluble compounds can be preferably used in the present invention. However, even water-insoluble compounds are usable in the form of emulsions or latex with appropriate emulsifiers. These are included in the scope of the present invention.

The amount of the polysaccharide relative to the polyvinyl compound is, for example, 0.5 to 10,000 parts by weight, preferably 1 to 1,000 parts by weight, more preferably 1 to 100 parts by weight of polysaccharide to 100 parts by weight of polyvinyl compound.

Further, the binders of the present invention may contain additives (sintering aids such as MgO, $SiO_2$ or Ca, other binders, plasticizers such as dibutyl phthalate, benzyl butyl phthalate, sorbitan esters or polyalkylene glycols, lubricants, dispersing agents, leveling agents, defoaming agents, etc.) in addition to the hydrophilic polymer and the polysaccharide.

Addition of a defoaming agent is effective in the case that the ceramics slurry contains bubbles. As the defoaming agents, there may be used fatty acids, higher alcohols, silicones, polyalkylene derivatives, polyether derivatives, and the like. Typical examples thereof include ANTIFLOSS F102 (Trade name of Dai-ichi Kogyo Seiyaku, Co., Ltd.)

The amount of the additives may be appropriately selected in a suitable range, for example, less than 5 parts by weight, preferably 0.01 to 2 part by weight per 100 parts by weight of powdery ceramics.

The powdery ceramics includes, for example, (1) inorganic oxides such as alumina, silica, magnesia, zirconia, titania, ferrite, barium titanate, lead titanate, lead titanate zirconate, synthetic cogerrite, mullite or the like; (2) inorganic carbides such as silicon carbide, boron carbide, titanium carbide or the like; (3) inorganic nitrides such as silicon nitride, boron nitride, aluminum nitride, titanium nitride or the like; (4) inorganic borides such as zirconium boride, titanium boride or the like;(5) natural or synthetic minerals such as kaolin, kaolinite, bentonite, zeolite, talc, sepiolite, synthetic clay, hydroxyapatite (calcium phosphate type compound) or the like; and (6) inorganic powder including carbon, carbon black or graphite powder, powdery magnetic material such as magnet or the like, powdery pigment, powdery superconductivity material or the like.

These ceramics powders are particularly useful as electrically functional material. Thus, alumina or the like is usable as insulating material (an integrated circuit substrate, a package, etc.), $BaTiO_3$ or the like is usable as ferroelectric material (a condenser, etc.); $BaTiO_3$, PZT or the like is usable as piezoelectric material (a vibrator, a transformer, etc.); SiC, $BaTiO_3$, $ZrO_2$, ZnO—$Bi_2O_3$, $V_2O_5$ or the like is usable as semiconducting material (an exothermic element, thermistor, varistor, etc.), and $\beta$-alumina, $ZrO_2$ or the like is usable as ion conductive material (a solid electrolyte, an oxygen sensor, etc.). Further, $SnO_2$, ZnO, NiO, cogerrite or the like is usable for a gas sensor or a humidity sensor as a chemical functional element.

Mean particle size of the ceramics powder is usually in the range of 0.1 to 20 $\mu$m, preferably 0.4 to 15 $\mu$m.

The present invention is effectively applied to an alumina or alumina-silica ceramics sheet as electric circuit substrates.

The ceramics slurry of the present invention comprises an aqueous medium as a solvent to disperse the ceramics powder. The aqueous medium includes water and a mixed solvent containing water and a small amount of water-soluble organic solvent, for example, alcohols such as methanol, ethanol, isopropanol or the like, cellosolves such as methyl cellosolve, ethyl cellosolve or the like. Preferred medium is water.

The aqueous ceramics slurry may be prepared by dispersing the ceramics powder and the binder in the aqueous medium.

According to the invention, the amount of the binder can be markedly reduced to give a favorable slurry. Generally, the binder is used in an amount of less than 25 parts by weight, preferably 0.5 to 25 parts by weight, more preferably 2 to 15 parts by weight, per 100 parts by weight of the ceramics powder. In this case, the amount of the binder is represented in solid content.

Further, a mixing ratio of the aqueous medium and the ceramics powder differs depending upon the sort of ceramics powder to be used, and the ratio can be suitably selected so as to produce the ceramics slurry appropriate for the doctor blade methods.

The amount of the aqueous medium is less than 900 parts by weight, preferably 20 to 400 parts by weight, more preferably 20 to 200 parts by weight to 100 parts by weight of ceramics powder.

The viscosity of the slurry, measured by a rotary viscosimeter (B type; Toki Sangyo Co., Japan), is, for example, 2,000 to 30,000 cps, preferably 3,000 to 5,000 cps, more preferably 4,000 to 20,000 cps at 20° C. and 5 r.p.m.

The ceramics slurry is prepared by mixing each ingredient in the mixing ratio according to a conventional manner. For example, the ceramics powder is mixed with the binder and the aqueous medium, and sufficiently stirred with a mixer (e.g. a sandmill, a ball mill, etc.) to give a ceramics slurry.

Mixing is conducted within the period of time when the slurry does not become viscous in the lapse of time as far as any coagulate does not remain in the slurry. Further, mixing is timely effected as far as each ingredient is sufficiently dispersed in the slurry. It is necessary to set satisfactory mixing conditions so that no defects such as cracks or the like occur in a dried ceramics green sheet. Furthermore, when the temperature of the slurry markedly raises by frictional heat during mixing, it is desirable to use such devices as using chilled water as an aqueous medium, adding ice or the like to the slurry and chilling a mixing vessel, so as to keep the slurry below about 40° C.

Further, the bubbles in the slurry are generally removed by conventional manner such as vacuum defoaming in order to give sheets free of defects. The defoaming procedure is generally effected after preparing the ceramics slurry and before applying the slurry on a carrier substrate.

A ceramics composition for preparing the ceramics slurry or sheet can be prepared by admixing the ceramics powder and the binder. Proportion of the binder to the ceramics powder is less than 25 parts by weight, preferably 0.5 to 25 parts by weight, more preferably 2 to 15 parts by weight of the binder to 100 parts by weight of the ceramics powder in the same as in the slurry.

The slurry thus prepared is formed into the sheet form, for example, by conventional manners such as doctor blade methods or the like. Forms of the edge of the doctor blade include two knives type, knife type, pipe type and the like. In general, a specific thickness of the slurry is usually applied on the carrier substrate and dried to give a ceramics green sheet on the substrate.

Such carrier substrate includes a stainless belt, a polymer film and sheet such as polyolefin film (e.g. polyethylene or polypropylene), teflon, polyester film (e.g. polyethyleneterephthalate or polybutylene terephthalate) and the like. Preferred substrate is the polymer film or sheet. As a polymer film, a polyester film and a polyester film coated with a silicone are used frequently.

The carrier substrate having even surface, tenacity and flexibility is preferably used. However, no special limitation is given to properties of the carrier substrate as far as the substrate has such properties as available in the molding apparatus.

The thickness of the slurry on the carrier substrate can be selected, depending upon the sort and forming conditions of the ceramics sheets. Height of the blade from the carrier substrate (blade opening degree) in the doctor blade method is usually, for instance, 0.05 to 1.5 mm, and the thickness of the slurry on the substrate corresponds to the blade opening degree.

Drying conditions can also be appropriately selected, depending upon thickness of a ceramics green sheet, concentration of the slurry, sort of the aqueous medium in the slurry, and the like. Drying is ordinarily conducted at room temperature for one day, or at below 80° C. for more than 2 hours under humidification by hot-air drying when water only is used as an aqueous medium.

The ceramics green sheet thus obtained is separated from the carrier substrate and sintered with a desired refractory vessel or base to give a ceramics sheet.

Since the ceramics green sheet is excellent in deflocculation property, the separated green sheet or scraps produced by a secondary processing can be used repeatedly by mixing with the slurry.

Sintering conditions are different depending upon the sort of ceramics powder, and sintering can be conducted by setting the optimal raising ratio of temperature, and the sintering temperature and time, in a conventional furnace such as an electric furnace. Appropriate sintering temperature can be selected in the range of 500° to 2,200° C. For example, sintering is effected at temperature of 1,300° to 1,600° C. when using alumina powder is used as ceramics powder.

According to the above procedures, ceramics sheets having various thicknesses can be prepared. For example, the alumina sheet may be used on the basis of its insulation as single layer substrates and multilayer substrates for high integration and downsizing. In order to prepare the laminated substrate, a circuit is printed on the ceramics green sheets having 0.2 to 0.3 mm thickness, and a plurality of the sheet are laminated and sintered to give a laminated ceramics sheet. Further, barium titanate sheets are usable as a capacitor or a resistor on the basis of its dielectricity and semiconductivity, and lead titanate and lead titanate zirconate are usable as a vibrator or an ignition element on the basis of its piezoelectricity.

The laminated ceramics sheet is prepared according to a similar manner to those above. For example, the ceramics green sheet developed on the carrier substrate is peeled off from the substrate and wound in the roll form, and the green sheet is subjected to a punching process for forming guide holes or through holes, and to a printing process for forming printed circuit on the sheet. A plurality of the processed sheets is laminated in multilayers and adhered under pressing. The laminated product is subjected to the sintering process to give the multilayered ceramics sheet.

The following examples are further illustrative of the invention but are by no means limitative of the scope thereof.

EXAMPLE

Example 1

An alumina slurry containing the following components was prepared by use of 150 g of alumina powder (ALM-41; Sumitomo Chemical Co., Ltd., Japan; mean particle size 1.8 μm).

Alumina powder (ALM-41; Sumitomo Chemical Co., Ltd., Japan): 100 parts by weight
Acrylic resin (CERAMO TB-01*; Dai-ichi Kogyo Seiyaku Co., Ltd., Japan): 10 parts by weight
*) Viscosity of 40% by weight of CERAMO TB-01, measured by a ELD-ST type rotary viscosimeter, was 9,320 cps at 25° C. and 5 r.p.m. The CERAMO TB-01 is water-soluble.
Curdlan (Takeda Chemical Industries, Ltd., Japan): 0.2 parts by weight
Polyglycol defoaming agent (ANTIFLOSS F102; Dai-ichi Kogyo Seiyaku Co., Ltd., Japan): 0.1 part by weight
Water: 45 parts by weight To a corundum pot (volume: 500 ml) were introduced the raw materials above together with 25 corundum balls (20 mm φ), and the pot was set into a planetary ball mill apparatus (P-5 type; Frichu Co.) and stirred for 30 minutes at 440 r.p.m. to obtain a ceramics composition. The composition in the pot was transferred to an eggplant flask (volume: 300 ml) and defoamed in vacuo under 20 torr for 30 minutes with a rotary evaporator to give an alumina slurry.

The slurry was subjected to a doctor blade apparatus (DP-150 type; Tsugawa Seiki Seisakusho Co., Japan), whereby sheet forming was performed at blade opening degree 0.5 mm, width 150 mm and a rate of a carrier film 300 mm/min. As the carrier film, a silicone-coated polyester film for the doctor blade was used.

The sheet thus formed was airdried for one day as it was on the carrier film to afford an alumina green sheet, and the shrinkage % of the sheet was calculated by measuring the width of the sheet before and after drying.

Comparative Example

An alumina green sheet was formed in the same manner as in Example 1 except that curdlan was not used. Evaluation of the resulting green sheet is shown in Table 1.

No good sheet was formed in case of using the binder in Comparative Example.

Example 2

An alumina green sheet was formed in the same manner as in Example 1 except that 6 parts by weight of acrylic resin and 0.6 parts by weight of curdlan were used to 100 parts by weight of alumina powder.

Example 3

An alumina green sheet was formed in the same manner as in Example 1 except that an aqueous solvent comprising 44.7 parts by weight of water and 0.3 parts by weight of ethanol was used in lieu of 45 parts by weight of water.

Example 4

An alumina green sheet was formed in the same manner as in Example 2 except that 0.4 parts by weight of curdlan and 0.2 parts by weight of pectin treated with ammonia were used in lieu of 0.6 parts by weight of curdlan to 100 parts by weight of alumina powder.

The treated pectin described was prepared by mixing 100 g of 2% aqueous pectin solution with 0.75 ml of 25% aqueous ammonia and aging at room temperature for 48 hours.

Example 5

An alumina green sheet was formed in the same manner as in Example 4 except that the amounts of acrylic resin, curdlan and pectin were respectively 2, 0.1 and 0.2 parts by weight to 100 parts by weight of alumina powder.

The viscosity of the slurry of Examples 1 to 5 and Comparative Example was measured at 20° C. and at 5 r.p.m. by a rotary viscosimeter (ELD-ST type; Toki Sangyo Co., Japan).

The standards of the evaluation are as follows.

Re: Forming characteristic
  The green sheet is free of crack and is easily released from the carrier film ... good; the green sheet has cracks ... poor.

Re: Flexibility
  The green sheet is easily bent by hand ... good; the green sheet is broken in bending it by hand ... poor.

Re: Surface smoothness
  Surface of the green sheet is smooth with no coagulated product ... good; coagulated product is observed on the surface of the green sheet, and no sheet having superficial smoothness is obtained ... poor.

The results are shown in Table 1.

Curdlan (Takeda Chemical Industries, Ltd.): 1 part by weight
Pectin treated with ammonia (Takeda Chemical Industries, Ltd.): 0.15 parts by weight
Polyglycol defoaming agent (ANTIFLOSS F102; Dai-ichi Kogyo Seiyaku Co., Ltd.): 0.1 part by weight
Water: 150 parts by weight The same aged pectin as in Example 4 was used.

To a corundum pot (volume: 500 ml) were introduced the mixed composition above together with 25 corundum balls (20 mm $\phi$), and the pot was set into a planetary ball mill apparatus (P-5 type; Frichu Co.) and stirred for 30 minutes at 570 r.p.m. The resulting mixture was transferred to an eggplant flask (volume: 300 ml) and defoamed in vacuo under 60 torr for 15 minutes with a rotary evaporator to give a hydroxyapatite slurry forming. Viscosity of the slurry was 5,933 cps (at 20° C., 5 r.p.m.)

The slurry was introduced into a doctor blade apparatus (DP-150 type: Tsugawa Seiki Seisakusho), whereby sheet-forming was performed at blade opening degree 0.5 mm and a speed of a carrier film 300 mm/min. As the carrier film, a silicone-coated polyester film for the doctor blade was used.

The formed sheet was airdried for one day as it was on the carrier film to give a hydroxyapatite green sheet and peeled off from the carrier film. The hydroxyapatite green sheet having excellent surface smoothness and free of cracks was obtained.

Example 8

TABLE 1

| | Alumina (parts by weight) | Binder (parts by weight) | | | Amount of aqueous solvent (parts by weight) | Viscosity of the slurry (cp) | Forming characteristic | Flexibility | Surface smoothness | Shrinkage percentage (%) |
| --- | --- | --- | --- | --- | --- | --- | --- | --- | --- | --- |
| | | (Meth)-acrylic resin | Curdlan | Pectin | | | | | | |
| Example 1 | 100 | 10 | 0.2 | 0 | Water: 45 | 11,500 | Good | Good | Good | 19 |
| Example 2 | 100 | 6 | 0.6 | 0 | Water: 45 | 13,900 | Good | Good | Good | 9 |
| Example 3 | 100 | 10 | 0.2 | 0 | Water: 44.7 Ethanol: 0.3 | 10,900 | Good | Good | Good | 20 |
| Example 4 | 100 | 6 | 0.4 | 0.2 | Water: 45 | 6,600 | Good | Good | Good | 21 |
| Example 5 | 100 | 2 | 1.0 | 0.2 | Water: 43 | 12,100 | Good | Good | Good | 7 |
| Comparative example | 100 | 10 | 0 | 0 | Water: 45 | 6,020 | Poor | Good | Poor | 50 |

Example 6

Recycling Test of the Green Sheet

A scrap (50 g) of the green sheet produced in Example 1 was mixed with an alumina slurry of the same composition as in Example 1, and sheet-forming was performed in the same manner as in example 1. A green sheet having the same forming property as in that of Example 1 was obtained even if the scrap had been added.

Example 7

Forming an Apatite Sheet

A hydroxyapatite slurry containing the following components was prepared by use of 80 g of hydroxyapatite powder (AN type; Central Glass Co., Ltd., Japan; mean particle size 13 μm).

Hydroxyapatite powder (AN, Central Glass Co., Ltd., Japan): 100 parts by weight
Acrylic resin (CERAMO TB-01, Dai-ichi Kogyo Seiyaku Co., Ltd.): 10 parts by weight

Forming a Zirconia Sheet

A zirconia slurry containing the following components was prepared by use of 150 g of powdery zirconia containing yttria (HSY-2.6; Dai-ichi Kigenso Co., Japan; mean particle size 0.47 μm).

Powdery zirconia (HYS 2.6, Dai-ichi Kigenso Co., Japan): 100 parts by weight
Acrylic resin (CERAMO TB-01, Dai-ichi Kogyo Seiyaku Co., Ltd.): 8 parts by weight
Curdlan (Takeda Chemical Industries, Ltd.): 0.7 parts by weight
Pectin treated with ammonia (Takeda Chemical Industries, Ltd.): 0.1 part by weight
Polyglycol defoaming agent (ANTIFLOSS F102; Dai-ichi Kogyo Seiyaku Co, Ltd.): 0.1 part by weight
Water: 48 parts by weight The same aged pectin as in Example 4 was used.

The slurry was prepared and subjected to the doctor blade forming procedures according to the same manner as in Example 7 except that mixing with the planetary ball mill was effected for 60 minutes.

Viscosity of the zirconia slurry was 13,008 cps. Further, the green sheet thus obtained was excellent in surface smoothness and had free of cracks.

Example 9

Drying Test of the Green Sheet

The green sheets obtained in example 1 to 5 were cut in a size of 60 mm×30 mm with a cutter knife, peeled off from the carrier film and completely dried at 115° C. for 24 hours.

Each test chip showed neither warping nor cracks even in such bone dry state.

Example 10

Preparation of a Ceramics Sheet

The green sheets obtained in Example 2 and 5 were cut in a size of 120 mm×120 mm with a cutter knife, peeled off from the carrier film, and put on the refractory plate disposed in an electric furnace (SB 2025D; Motoyama Co., Japan). The sheets were heated in the furnace to 1,600° C. at a heating rate of 200° C./hour, kept at 1,600° C. for 3 hours and allowed to cool within the furnace. The resulting sintered sheets free of warping and cracks were obtained.

Example 11

Preparation of a Ceramics Sheet

The green sheet obtained in Example 7 was cut in a size of 80 mm×40 mm, peeled off from the carrier film, put on the refractory plate disposed in the electric furnace (SB 2025D; Motoyama Co.). The sheet was heated in the furnace to a calcining temperature of 800° C., 1,000° C. and 1,200° C. at heating rate of 200° C./hour, kept at said three calcining temperature for 2 hours and allowed to cool within the furnace to give three ceramics sheet. The sintered sheets being excellent in surface smoothness and free of cracks were obtained, at any calcining temperature.

Example 12

Preparation of an Alumina Sheet

An alumina slurry containing the following ingredients was prepared in the same manner as in Example 1.
Alumina powder (ALM-41; Sumitomo Chemical Co., Ltd.): 100 parts by weight
Acrylic resin (CERAMO TB-01; Dai-ichi Kogyo Seiyaku Co., Ltd.): 5 parts by weight
Poly(vinyl butyral) resin (CERAMO TB-13*; Dai-ichi Kogyo Seiyaku Co., Ltd.): 5 parts by weight
*) Viscosity of 25% by weight of CERAMO TB-13, measured by a ELD-ST type rotary viscosimeter, was 11,200 cps at 25° C. and 2.5 r.p.m.
Curdlan (Takeda Chemical Industries, Ltd.): 0.1 part by weight
Pectin treated with ammonia (Takeda Chemical Industries, Ltd., Japan): 0.05 parts by weight
Polyglycol defoaming agent (ANTIFLOSS F102; Dai-ichi Kogyo Seiyaku Co., Ltd.): 0.2 parts by weight
Water: 64 parts by weight
In this Example, the same aged pectin as in Example 4 was used.

A green sheet was produced by subjecting the slurry to the same doctor blade method as in Example 1.

Example 13

Preparation of an Alumina Sheet

An alumina slurry containing the following components was prepared by use of alumina powder (AL-160 SG-4; Showa Denko K. K, Japan; mean particle size 0.6 μm) in the same manner as in Example 1.
Alumina powder (AL-160 SG-4, Showa Denko K. K.): 100 parts by weight
Acrylic resin (CERAMO TB-01; Dai-ichi Kogyo Seiyaku Co., Ltd.): 5 parts by weight
Poly(vinyl butyral) resin (CERAMO TB-13; Dai-ichi Kogyo Seiyaku Co., Ltd.): 5 parts by weight
Curdlan (Takeda Chemical Industries, Ltd.): 0.1 part by weight
Pectin (Takeda Chemical Industries, Ltd.): 0.3 parts by weight
Polyglycol defoaming agent (ANTIFLOSS F102; Dai-ichi Kogyo Seiyaku Co., Ltd.): 0.2 parts by weight
Water: 60 parts by weight
By use of the slurry composition, a green sheet was prepared in the same manner as in Example 1.

Example 14

Preparation of an Alumina Sheet

An alumina slurry including the following components was prepared in the same manner as in Example 1.
Alumina powder (AL-160 SG-4; Showa Denko K. K.): 100 parts by weight
Acrylic resin (CERAMO TB-01; Dai-ichi Kogyo Seiyaku Co., Ltd.): 3 parts by weight
Poly(vinyl butyral) resin (CERAMO TB-13; Dai-ichi Kogyo Seiyaku Co., Ltd.): 7 parts by weight
Curdlan (Takeda Chemical Industries, Ltd.): 0.1 parts by weight
Pectin (Takeda Chemical Industries, Ltd.): 0.2 parts by weight
Polyglycol defoaming agent (ANTIFLOSS F102; Dai-ichi Kogyo Seiyaku Co., Ltd.): 0.2 parts by weight
Water: 52 parts by weight
The slurry composition was subjected to the doctor blade forming in the same manner as in Example 1.

Example 15

Preparation of an Alumina Sheet

An alumina slurry containing the following components was prepared in the same manner as in Example 1.
Alumina powder (ALM-41; Sumitomo Chemical Co., Ltd.): 100 parts by weight
Acrylic resin (CERAMO TB-01; Dai-ichi Kogyo Seiyaku Co., Ltd.): 5 parts by weight
C-HEVA (DUMILAN ™ C-1550; Takeda Chemical Industries, Ltd.): 2 parts by weight
Curdlan (Takeda Chemical Industries, Ltd.): 0.1 parts by weight
Pectin (Takeda Chemical Industries, Ltd.): 0.3 parts by weight
Polyglycol defoaming agent (ANTIFLOSS F102; Dai-ichi Kogyo Seiyaku Co., Ltd.): 0.2 parts by weight
Water: 50 parts by weight
The DUMILAN ™ C-1550 is a dispersion which C-HEVA is emulsified and dispersed with a poly(vinyl alcohol) (Kuraray Co., Ltd., Japan).

By use of the slurry composition, a green sheet wad produced in the same manner as in Example 1.

Example 16

Preparation of an Alumina Sheet

An alumina slurry containing the following components was prepared in the same manner as in Example 1.
Alumina powder (ALM-41; Sumitomo Chemical Co., Ltd.): 100 parts by weight
Acrylic resin (CERAMO TB-01; Dai-ichi Kogyo Seiyaku Co., Ltd.): 7.5 parts by weight
C-HEVA (Dumilan ™ C-1550; Takeda Chemical Industries, Ltd.): 5 parts by weight
Curdlan (Takeda Chemical Industries, Ltd.): 0.1 part by weight
Pectin (Takeda Chemical Industries, Ltd.): 0.3 parts by weight
Polyglycol defoaming agent (ANTIFLOSS F102; Dai-ichi Kogyo Seiyaku Co., Ltd.): 0.2 parts by weight
Water: 50 parts by weight By use of the slurry composition, a green sheet was prepared in the same manner as in Example 1.

The ceramics green sheets of Examples 12 to 16 were evaluated according to the same criterium as in Example 1. Further, each ceramics green sheet of Examples 12 to 16 and Comparative Example was cut in a size of 40 mm×50 mm, and the resulting five sample sheets were laminated at 170° C. under pressing 10 kg/cm² for 20 minutes by use of a desk type presser (SA 302 type; Tester Sangyo Co., Ltd., Japan). The laminates were cut respectively, and the cutting surface thereof were observed. Regarding to "the thermal adhesion under pressing" in Table 2, standard "good" is given when each layer of the laminate was not confirmed with naked eyes. The handleability of the sheet was estimated based on stickiness and cutting quality of the sheet.

The results are shown in Table 2.

TABLE 2

| | Alumina (parts by weight) | Binder (parts by weight) | | | | Amount of aqueous solvent (parts by weight) | Viscosity of the slurry (cp) |
|---|---|---|---|---|---|---|---|
| | | (Meth)-acrylic resin | Curdlan | Pectin | Polyvinyl compound | | |
| Example 12 | 100 | 5 | 0.1 | 0.05 | 5 | Water: 64 | 5,550 |
| Example 13 | 100 | 5 | 0.1 | 0.3 | 5 | Water: 60 | 6,480 |
| Example 14 | 100 | 3 | 0.1 | 0.2 | 7 | Water: 52 | 11,300 |
| Example 15 | 100 | 5 | 0.1 | 0.3 | 2 | Water: 50 | 3,500 |
| Example 16 | 100 | 7.5 | 0.1 | 0.3 | 5 | Water: 50 | 5,800 |
| Comparative example | 100 | 10 | 0 | 0 | 0 | Water: 45 | 6,020 |

| | Forming characteristic | Flexibility | Surface smoothness | Thermal adhesion under pressing | Handleability of the sheet |
|---|---|---|---|---|---|
| Example 12 | Good | Good | Good | Good | Good |
| Example 13 | Good | Good | Good | Good | Good |
| Example 14 | Good | Good | Good | Good | Good |
| Example 15 | Good | Good | Good | Good | Good |
| Example 16 | Good | Good | Good | Good | Good |
| Comparative example | Poor | Good | Poor | Poor | Poor |

Example 17

Preparing a laminated ceramics Sheet

The green sheet of Example 16 was cut in a size of 30 mm×30 mm with a cutter knife, peeled off from the carrier film. The obtained eight sheets were laninated at 120° C. under pressing 100 kg/cm² for 10 minutes by use of a desk type presser (SA 302 type; Tester Sangyo Co., Ltd.). The laminate was sintered in the same manner as in Example 10 to produce a laminated ceramics sheet being free of warping and cracks.

What is claimed is:

1. A binder for forming a ceramics sheet, which comprises (1) a hydrophilic polymer having an acrylic monomer and/or a methacrylic monomer as its monomer component, (2) a polysaccharide of natural origin and (3) a poly(vinyl acetal).

2. A binder according to claim 1, wherein the hydrophilic polymer is a water-soluble polymer.

3. A binder according to claim 1, wherein the hydrophilic polymer is one having a viscosity in the range of 100 to 20,000 cps at 25° C. as a 40% by weight of aqueous solution.

4. A binder according to claim 1, wherein the polysaccharide is a member selected from the group consisting of extractive polysaccharides, seed polysaccharides, exudate polysaccharides, red seaweed polysaccharides, brown seaweed polysaccharides, structural polysaccharides and food-reserve polysaccharides originated from plant; stractural polysaccharides and mucopolysaccharides originated from animal; 1,3-glucans, 1,4-glucans, dextran, gellan gum and xanthane gum originated from microorganism; and a mixture thereof.

5. A binder according to claim 1, wherein the polysaccharide is pectin, pectinic acid or glucan.

6. A binder according to claim 1, wherein the polysaccharide is $\beta$-1,3-glucan.

7. A binder according to claim 6, wherein the $\beta$-1,3-glucan is curdlan, paramylon, pachyman or scleroglucan.

8. A binder according to claim 1, wherein the polysaccharide is curdlan.

9. A binder according to claim 1, comprising as polysaccharides $\beta$-1,3-glucans and pectin.

10. A binder according to claim 1, wherein the polysaccharide is a lower molecular polysaccharide.

11. A binder according to claim 1, wherein the ratio of the polysaccharide relative to the hydrophilic polymer is 0.5 to 10,000 parts by weight of polysaccharide to 100 parts by weight of hydrophilic polymer.

12. A binder according to claim 1, wherein the poly(vinyl acetal) is one having a viscosity in the range of 100 to 30,000 cps at 25° C. as a 25% by weight of aqueous solution.

13. A binder according to claim 1, wherein the poly(vinyl acetal) is a poly(vinyl butyral).

14. A binder according to claim 1, wherein the polysaccharide is β-1,3-glucans or pectin.

15. A binder according to claim 1, wherein the ratio of the polysaccharide relative to the poly(vinyl acetal) is 1 to 10,000 parts by weight of polysaccharide to 100 parts by weight of polyvinyl compound.

* * * * *